United States Patent
Walter et al.

(10) Patent No.: US 11,588,917 B2
(45) Date of Patent: Feb. 21, 2023

(54) METHOD FOR A COMMUNICATION BETWEEN AN APPLICATION AND A MACHINE IN A PRODUCTION

(71) Applicant: Robert Bosch GmbH, Stuttgart (DE)

(72) Inventors: Sven Walter, Stuttgart (DE); Benjamin Bauer, Immenstaad (DE); Markus Schaertel, Uhldingen-Muehlhofen (DE); Michael Kailer, Gaertringen (DE); Peter Klotz, Weil der Stadt (DE); Steffen Stadtmueller, Stuttgart (DE); Ursula Koehler, Affalterbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/044,562

(22) PCT Filed: Apr. 16, 2019

(86) PCT No.: PCT/EP2019/059791
§ 371 (c)(1),
(2) Date: Oct. 1, 2020

(87) PCT Pub. No.: WO2019/201911
PCT Pub. Date: Oct. 24, 2019

(65) Prior Publication Data
US 2021/0044668 A1    Feb. 11, 2021

(30) Foreign Application Priority Data

Apr. 18, 2018   (DE) .................... 10 2018 205 872.5

(51) Int. Cl.
*H04L 12/24*   (2006.01)
*H04L 41/0803*   (2022.01)
(Continued)

(52) U.S. Cl.
CPC ............ *H04L 67/565* (2022.05); *H04L 67/12* (2013.01)

(58) Field of Classification Search
CPC .... H04L 67/2823; H04L 67/12; H04L 67/565
(Continued)

(56) References Cited

U.S. PATENT DOCUMENTS 10,574,840 B1 * 2/2020 Sabandith ............ G06K 9/6217
10,911,623 B1 * 2/2021 Zhang .................... G06F 3/1229
(Continued)

OTHER PUBLICATIONS

Kersten and Oppenheimer: "Object-oriented Cosimulation of Embedded Control Systems" [in German: Objektorientierte Cosimulation eingebetteter Steuerungssysteme], in Final Report: DFG Priority Program 1040, Design and design methodology of embedded systems, (2003), pp. 53-56, URL: http://www.dfg.de/download/pdf/dfg_im_profil/geschaeftsstelle/publikationen/abschlussbericht_spp1040.pdf [accessed on Jan. 7, 2019].
(Continued)

*Primary Examiner* — Ario Etienne
*Assistant Examiner* — Elizabeth Kassa
(74) *Attorney, Agent, or Firm* — Norton Rose Fulbright US LLP; Gerard Messina

(57) ABSTRACT

A method for a communication between an application and a machine in a production or a physical object with the aid of a digital twin of a machine in a production or a physical object. Descriptive data including properties of digital data are generated based on a descriptive meta model. In addition, communication information is produced. To create the digital twin, the descriptive data, the communication information and a designation of the machine or the physical object are combined and stored in a list in order to create the digital twin. The application reads out the information of the list and uses it for a data exchange with the machine.

14 Claims, 3 Drawing Sheets

(51) Int. Cl.
*H04L 67/565* (2022.01)
*H04L 67/12* (2022.01)

(58) Field of Classification Search
USPC .......................................................... 703/203
See application file for complete search history.

(56) References Cited

U.S. PATENT DOCUMENTS

| | | | | |
|---|---|---|---|---|
| 2001/0046862 | A1* | 11/2001 | Coppinger | H04L 67/28 |
| | | | | 455/435.1 |
| 2005/0210060 | A1* | 9/2005 | Borchers | H04N 1/00344 |
| | | | | 707/999.102 |
| 2011/0304891 | A1* | 12/2011 | Masuda | H04N 1/00411 |
| | | | | 358/442 |
| 2015/0070718 | A1* | 3/2015 | Samejima | H04N 1/00973 |
| | | | | 358/1.13 |
| 2015/0248263 | A1* | 9/2015 | Hattori | G06F 3/1204 |
| | | | | 358/1.15 |
| 2016/0328883 | A1* | 11/2016 | Parfenov | G06F 40/169 |
| 2019/0138333 | A1* | 5/2019 | Deutsch | G06Q 10/0639 |
| 2019/0138662 | A1* | 5/2019 | Deutsch | G06F 30/00 |
| 2019/0251575 | A1* | 8/2019 | Berti | G06F 16/27 |
| 2019/0258747 | A1* | 8/2019 | Milev | G06F 16/90335 |
| 2019/0287079 | A1* | 9/2019 | Shiraishi | G07C 5/0841 |
| 2019/0354922 | A1* | 11/2019 | Berti | G06F 21/6209 |
| 2020/0050163 | A1* | 2/2020 | Ludwig | G05B 19/0426 |
| 2020/0090085 | A1* | 3/2020 | Martinez Canedo | ......... |
| | | | | G06F 16/9024 |
| 2020/0265329 | A1* | 8/2020 | Thomsen | G06N 20/10 |

OTHER PUBLICATIONS

Parrott and Warshaw: "Industry 4.0 and the digital twin—Manufacturing meets its match", Deloitte University Press, (2017), pp. 1-17; URL: https://www2.deloitte.com/insights/us/en/focus/industry-4-0/digital-twin- technology-smartfactory.html [accessed on Jan. 7, 2019].

Pettit and Street: "Lessons Learned Applying UML in the Design of Mission Critical Software", N. Jardim Nunes et al. (Eds.): UML, 2004 Satellite Activities, LNCS 3297, (2005), pp. 129-137, © Springer-Verlag Berlin Heidelberg.

International Search Report for PCT/EP2019/059791, dated Jun. 26, 2019.

Wagner Constantin et al., "The Role of the Industry 4.0 Asset Administration Shell and the Digital Twin During the Life Cycle of a Plant," 2017 22nd IEEE International Conference on Emerging Technologies and Factory Automation (ETFA), IEEE, 2017, pp. 1-8.

Lutz Rauchhaupt et al., "Network-Based Communication for Industrie 4.0—Proposal for an Administration Shell," Berlin, 2016, pp. 1-28.

Heinz Bedenbender et al., "White Paper—Beispiele Zur Verwaltungsschale Der Industrie 4.0-Komponente—Basisteil," Frankfurt Am Main, 2016, pp. 1-24.

Peter Adolphs et al., "Struktur Der Verwaltungsschale—Fortentwicklung Des Referenzmodells Fur Die Industrie 4.0-Komponente," Berlin, 2016, pp. 1-52.

Diedrich Christian et al., "Semantic Interoperability for Asset Communication Within Smart Factories," 2017 22nd IEEE International Conference on Emerging Technologies and Factory Automation (ETFA), IEEE, 2017, pp. 1-8.

* cited by examiner

METHOD FOR A COMMUNICATION BETWEEN AN APPLICATION AND A MACHINE IN A PRODUCTION

The present invention relates to a method for a communication between an application and a machine in a production. In general, the term 'digital twin' is understood to mean that the digital twin constitutes a digital representation of an object from the real world. The digital twin enables a data exchange between the object from the real world and digital systems.

SUMMARY

In accordance with an example embodiment, the method according to the present invention for a communication between an application and a machine in a production has the advantage of simplifying the creation of the digital twin by the clear separation of the descriptive data and the communication information. The descriptive data are able to be structured clearly and comprehensively by the descriptive meta model. In an especially simple manner, the descriptive meta model allows for the use of already prestructured descriptive data, which simplifies the production of these data. Alternatively, however, any other descriptive data for special application cases are able to be produced by the descriptive meta model. Because of the clear separation of the descriptive data and the communication information, the scalability, or in other words, the application both in simple and complex machines in a production or in physical objects is possible, in particular, and it is also possible to compose a digital twin for a large machine in a production from the already known digital twins of a multitude of small machines in a production. In addition, the development of the descriptive data is independent of the actual implementations because of the clear separation of the descriptive data and the communication information. The descriptive data are therefore independent of the utilized communications means, e.g., bus systems or communications protocols or also of the computer systems or operating systems used for the implementation. The present method allows for a scalable creation of a randomly large number of digital twins insofar as a multitude of digital twins for different machines in a production or physical objects and different applications is able to be created in an efficient manner, or in other words, the expense for producing digital twins is minimized.

Additional advantages and improvements of the present invention result from the measures described herein. For practical purposes, the descriptive data include a designation and properties of the data. The general characteristics involve general properties of the data that are able to be used in a multitude of cases, in particular. These general characteristics are therefore partly included in the descriptive meta model as a library. However, the descriptive meta model is not complete and thus makes it possible to define special characteristics that especially describe specific properties of a physical object or a machine in a production. In general, both the general and the special characteristics allow for a semantic explanation or interpretation so that clear properties of the machine in a production or of the physical object are allocated to these characteristics. In particular, typical characteristics represent a measured value of the machine in a production or a control value for the machine. They may represent a multitude of properties but also allow for a content-related interpretation with regard to a sequence, a time period, a permissible value range, a measure to be applied, a unit of measurement, the data structure or the significance of the data with regard to the machine. The communication information typically includes interface information and communications protocols. The interfaces indicate addresses for the exchange of digital data with the digital twin. The communications protocols indicate the methods required for the communication with the indicated interfaces. The creation of a digital twin is carried out in a particularly uncomplicated manner if the descriptive data are taken from a catalogue which includes types of descriptive data. In this context, even entire groups of descriptive data that are normally of importance for a digital twin of a certain machine are able to be held in store in the form of a catalog.

BRIEF DESCRIPTION OF THE DRAWINGS

Exemplary embodiments of the present invention are shown in the figures and are described in greater detail in the associated description.

DETAILED DESCRIPTION OF EXAMPLE EMBODIMENTS

Figure 1:
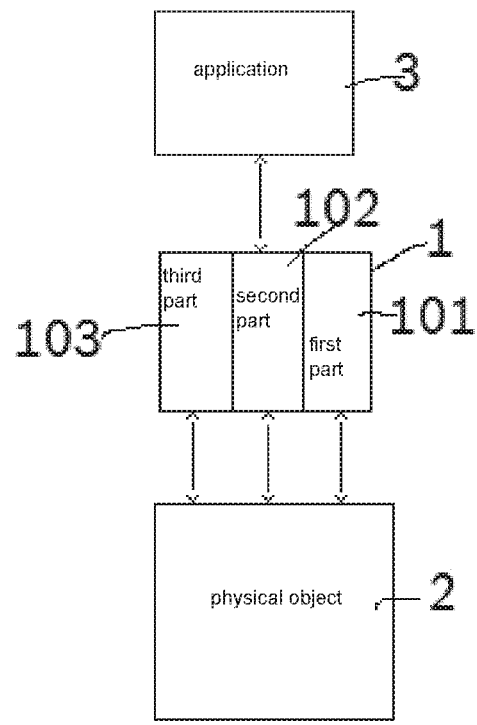
FIG. 1 shows a machine in a production, an associated digital twin, and an application which utilizes the data of the digital twin.

FIG. 1 schematically illustrates a digital twin 1, which is configured for a data exchange between a machine 2 in a production and an application 3.

Application 3 involves a digital application, or in other words, a program which is realized on a computer or a network of a plurality of computers. With the aid of such an application 3, a human user is able to query information about the machine 2 in a production from application 3 or trigger or control actions of the machine in a production 2 by way of corresponding control commands.

The machine 2 in a production is typically a machine tool, a processing center or any other machine in a production. As an alternative, multiple machines are able to be combined into a physical object, e.g., multiple machines which jointly form an entire factory. Other machines not in a production, or other objects that are able to exchange data with an application 3 are simply denoted as physical objects. In the following text, the terms 'machine' or 'physical object' are considered to be synonymous in each case. In addition, combinations of digital applications and real machines or physical objects are possible, or simulations of physical objects are possible which are considered a physical object 2 in the sense of the present invention, which is then connected to application 3 by a digital twin 1.

Digital twin 1 is connected to application 3 by a connection arrow and to physical object 2 by multiple connection arrows. Each of these arrows represents an exchange of data, which—depending on the nature of these data —may take place in the one or in the other direction or else in both directions. A first part 101, a second part 102, and a third part 103 of digital twin 1 are shown in FIG. 1 by way of example. First part 101, for instance, involves the readout of a sensor value of physical object 2, that is to say, data are transferred from physical object 2 to application 3 by digital twin 1. In the second example 102, control commands of application 3 are forwarded to digital twin 2. State changes or diagnostic data are exchanged between application 3 and physical object 2 by third part 103. For example, application 3 is able to forward a switch-on or switch-off signal to the physical object, and when a disturbance occurs, physical object 2 is able to forward error codes generated in physical object 2 to application 3. Depending on the function, a data exchange is thus able to be carried out in only one direction or else in both directions at the same time.

In addition, the direction of the data exchange also depends on the communications protocols used by the data exchange. For example, it may be provided that digital twin 1 queries data on a continuous basis or holds the data in readiness at a memory address for application 3. In such a case, application 3 would query only a current value of physical object 2 at digital twin 1. However, it is also possible to use other communication protocols in which application 3 first directs a query to digital twin 1, which then fetches the desired data through a communication with physical object 2, and then forwards it to application 3. The communication would take place in both directions in this case.

In the implementation of the individual parts of digital twin 101, 102, 103, it is not necessary to provide a unified device, computer or processing system for the implementation. Instead, the individual components 101, 102, 103 of a digital twin 1 may be distributed to different systems, in particular computer systems, in different developments. This is schematically illustrated in FIG. 2.

FIG. 2 once again shows an application 3 and a physical object 2, but the different parts of digital twin 101, 102, 103 are not shown as a unified block but illustrated in a pulled apart form. For example, first component 101 is able to be realized by a sensor, which is directly fixed in place in physical object 2 and immediately makes digital data available on a bus system. As an alternative, such an acquisition of measured data of physical object 2 could also be realized by mounting a camera in the vicinity of physical object 2, which acquires certain measured values of physical object 2. Part 102 of the digital twin has the function of supplying control data from application 3 to physical object 2 The actuation of the physical object may be realized by a control computer of physical object 2, for example, and the implementation of digital twin 102 is then directly integrated into this control computer. Component 103 is able to be realized in a fabrication computer, for example, which manages a multitude of physical objects 2. Although a digital image or representation of physical object 2 is thus created by the digital twin in such a case, individual parts 101, 102, 103 of this digital twin 1 are able to be realized in totally different computer systems, in particular also using different operating systems.

In order to take account of these different developments of the implementation of digital twin 1, a list 4 is provided which stores information about the digital twins. In list 4, which is sometimes also referred to as a registry, communication information is stored that includes properties of the created digital twins, which are made available by the implementations. In addition, list 4 includes an identification as to which data are implemented in the digital twin for which physical object 2. Moreover, list 4 includes information about the interfaces, i.e. the addresses that are used for the data exchange between digital twin 1 and application 3. With regard to these interfaces, communications protocols are then stored as well, which indicate which methods or which ways are used for the communication with the interfaces. Furthermore, list 4 includes references to the descriptive data describing the data that are able to be exchanged via an interface. Through these designations of physical object 2 and also the designations of the data in the implementations of the digital twins, the data called up by application 3 are able to be uniquely identified. It can therefore be unequivocally verified from which physical object the data originate and which contents are included in the data.

Figure 2:
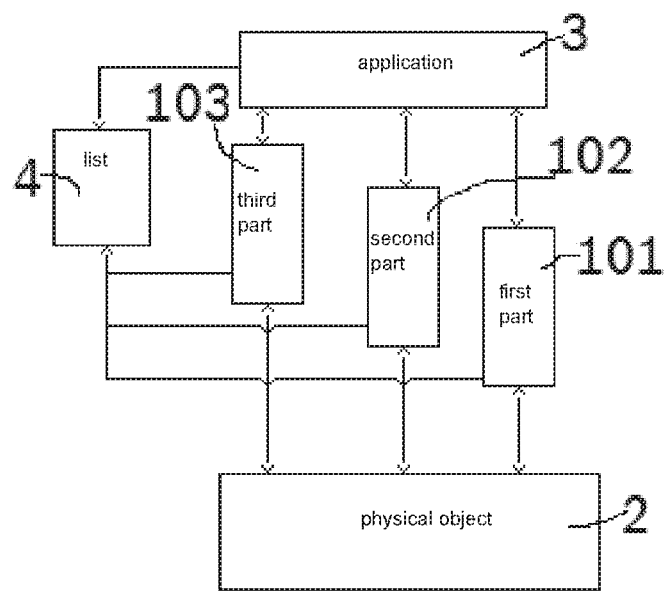
FIG. 2 shows a machine in a production, a digital twin, and an application.

FIG. 2 schematically indicates a connection between the individual parts 101, 102, 103 of the implementation of the digital twin, by which it is illustrated that the information included in the implementation is forwarded to list 4. In the same way it is also possible that entries in list 4 are simultaneously also made at the time when the implementation is created. Application 3 is able to communicate with digital twin 1 through the readout of the information in list 4. Through the readout of list 4, different applications 3 that intend to interact with physical object 2 are particularly able to receive all information required for a data exchange with physical object 2.

Application 3 is able to read out the information from list 4, for instance during a startup of a computer on which application 3 is executed. However, a read-in of the information from the list to application 3 is also able to take place at regular intervals or in response to an event. An event, for example, may be an error report indicating that certain data of digital twin 1 are no longer accessible, or an event which is manually triggered by a user such as a service technician.

For the creation of digital twin 1, descriptive data which include the properties of the digital data exchanged with the machine or physical object 2 must be produced to begin with. In addition to this information, communication information then has to be provided as well, this communication information including information with regard to the addresses via which an application 3 is able to call up data from implementations 101, 102, 103. This communication information furthermore includes information regarding the communication protocols to be used for this purpose. As already mentioned in the previous text, the individual implementations are able to be realized on different computer systems using different operating systems and thus also different communication protocols. All of this information is combined in the communication information.

Figure 3:
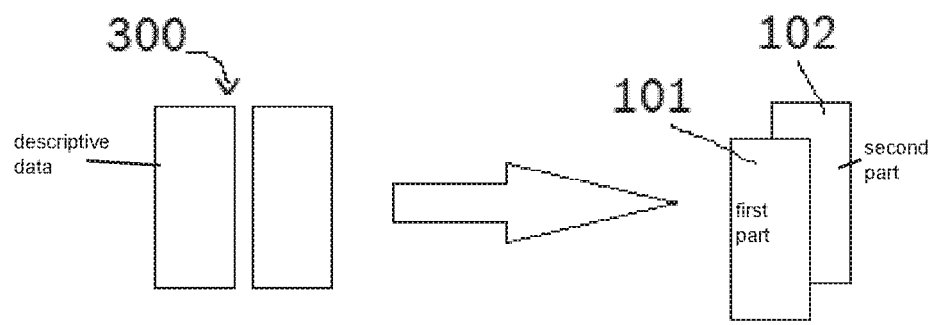
FIG. 3 shows a preparation of descriptive data, each property being individually defined in the meta model.
Figure 4:
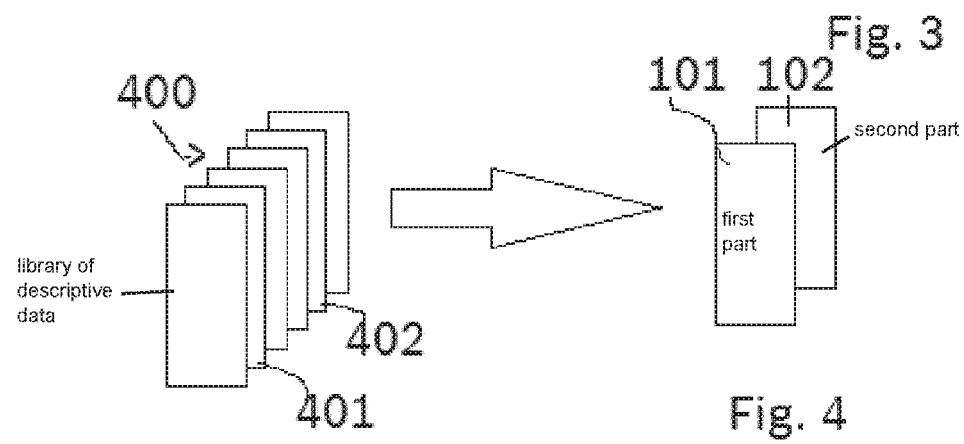
FIG. 4 shows a compilation of descriptive data in which individual properties are selected in the meta model from a library of properties.
Figure 5:
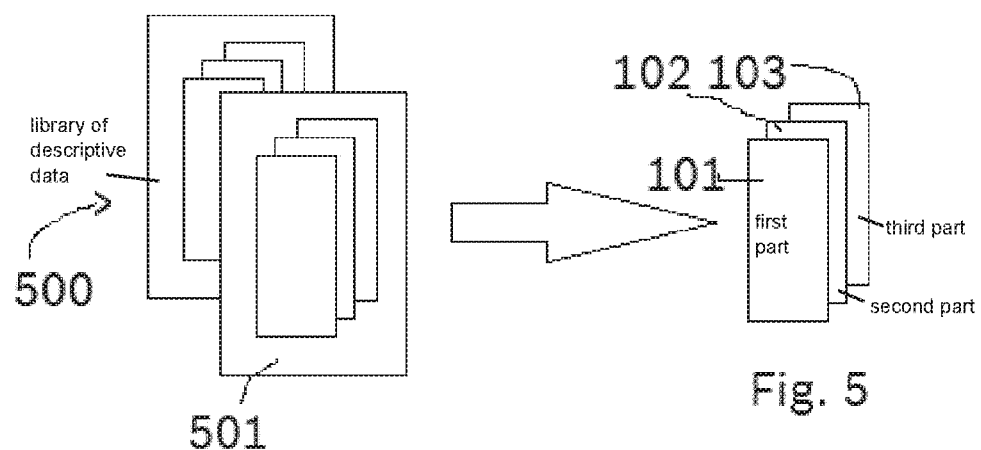
FIG. 5 shows a creation of descriptive data in which a property group is selected in the meta model from a catalog of different property groups.

In FIGS. 3 through 5, different methods will now be described as to how the descriptive data for the creation of the digital twin are compiled based on the descriptive meta model. The descriptive meta model is shown on the left side, and the implementations of the digital twin created thereby are illustrated on the right side.

In FIG. 3, individual datasets with descriptive data (300) are generated on the left side based on the descriptive meta model. A certain frame, which specifies a structure of the data, may be predefined for the data on the basis of the descriptive meta model. In one particularly simple development, a form may simply be provided for this purpose, its individual properties being entered by a user intending to create such a digital twin. However, the descriptive meta model should offer sufficient options for an individual definition even of completely new data in the descriptive meta model that are required only for individual special applications, so that implementations 101, 102 are able to be prepared therefrom.

FIG. 4 shows an alternative creation of implementations 101, 102. A library 400 of different descriptive data, which are made up of datasets including individual properties of digital data in each case, is provided in the descriptive meta model for this purpose. Also included in library 400 is a dataset 401 and a dataset 402, which include the descriptions regarding implementations 101, 102 in each case. By selecting these datasets from library 400, it is quite easy to create implementation 101, 102 by adding the requisite communication information.

FIG. 5 shows an alternative model in which the descriptive meta model has a library 500 which includes complete data for different physical objects. All required data with regard to the properties of digital data of a complete physical object are included in such a dataset. Through a selection of dataset 501 and the addition of the required communication information, implementations 101, 102, 103 as shown in FIG. 2 are generated by a single step.

For many applications, in particular in the case of larger systems, the methods shown in FIGS. 3 through 5 are used simultaneously. The method according to FIG. 5 is typically used for a multitude of standardized physical objects such as similar machines in a production because each of these machines has the same design and is therefore also realized as a digital twin in a similar fashion. In addition, there may also be deviations to the effect that individual ones of the physical objects have a slightly different design than the others. For instance, production systems of basically the same type may differ with regard to the tools that are used or the like. For such a constellation the procedure according to FIG. 4 then suggests itself, in which, depending on the development of the specific machine, individual datasets are selected from library 400 in order to prepare a corresponding implementation customized for each physical object. In addition, it is also possible to provide individual physical objects that have currently not yet been imaged by digital twins in this way and which will then have to be individually set up according to FIG. 3. This procedure is also meaningful if a multitude of objects that are already realized as a digital twin are to be combined for an overall view. For instance, if an indicator of an overall state of the production is desired in a production, then a certain datum of all machines of the production is easily definable according to the procedure of FIG. 3 in order to thereby obtain a total overview of a production system.

Figure 6:
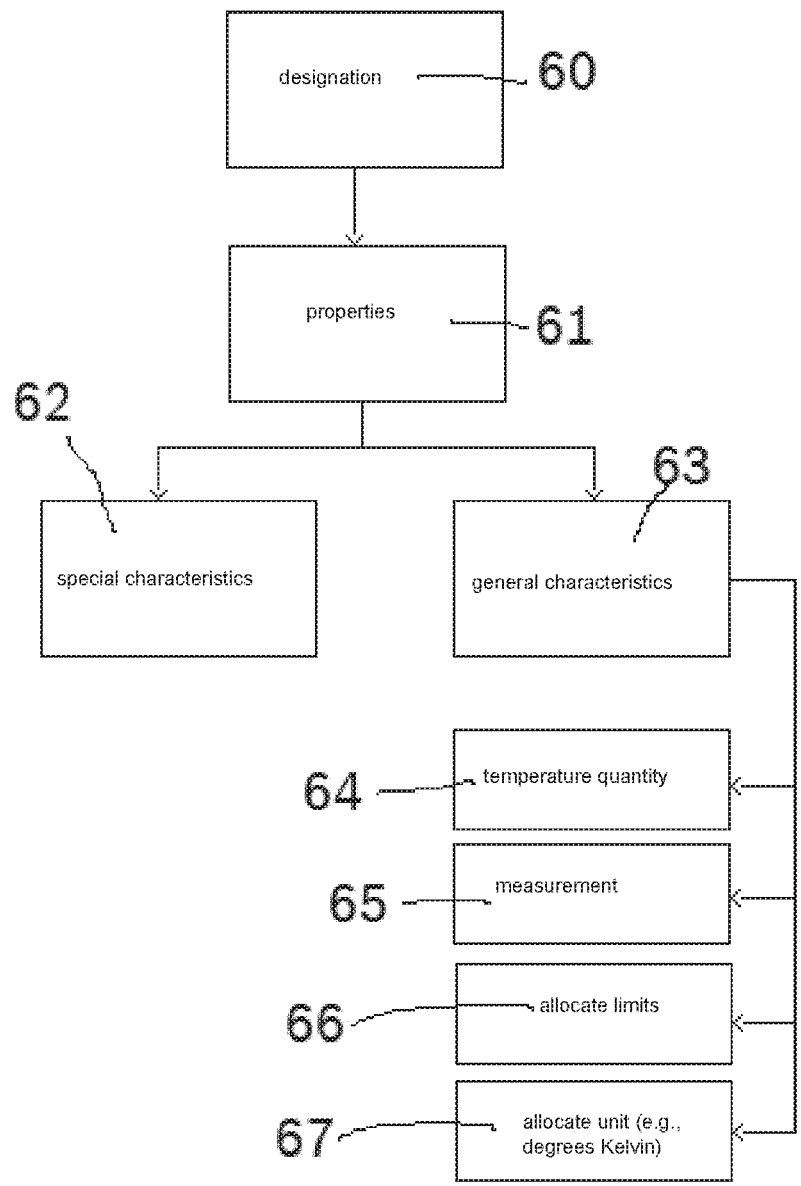
FIG. 6 shows an exemplary structure of the descriptive meta model.

In FIG. 6, a meta model is schematically illustrated by which the descriptive data for producing the implementations of the digital twins are produced. In a first block 60, a designation of a property first takes place, so that the descriptive data are uniquely identifiable through this designation. For instance, a description of the corresponding data may additionally be included in block 60. Designation 60 features properties 61, each property being initially provided with a name in block 61 and also with a readable description for a user of the system. Properties 61 have characteristics, with special characteristics 62 and general characteristics 63 being provided. General characteristics 63 usually involve properties of a general nature and thus are able to be reused multiple times in different implementations. A typical example of such a property would be a measuring device for a temperature, for instance. The general characteristic 'oven temperature' is added to the temperature property. Still further details are then added to the general characteristic 'oven temperature 63'. The reference to block 64 makes it clear that a temperature quantity is involved. This information indicates that this measured value is able to be compared with other temperatures. Block 65 clarifies that a measurement is involved, i.e. a measured temperature. In other words, no calculated or simulated temperature is involved. Limits, such as between 0 and 300 degrees, are then allocated to this temperature through block 66. In addition, unit 67 such as degrees Kelvin is allocated to the oven temperature.

However, it is also possible to allocate a special characteristic 62 to property 61. Such special characteristics involve properties that are special to an application or special to a physical object. For instance, such a special characteristic may consist of a description of error codes that are allocated to a machine representing the physical object. Since these special characteristics describe a property that is not universally applicable, it must usually be specified for each application case on an individual basis.

Based on this descriptive meta model, the descriptive data are described that include properties of the digital data exchanged between physical object 2 and application 3. The communication information and a designation of the respective physical object must then still be added to these descriptive data in order to obtain a concrete implementation of the digital twin. This information is subsequently used for preparing the individual implementations 101, 102, 103 and list 4. The properties described by the descriptive meta model make it possible to interpret the descriptive data for application 3. Because of the communication information, the data of digital twin 1 become freely accessible to application 3 to the effect that it uses the indicated addresses in order to read out information from digital twin 1 or to convey information to digital twin 1 using the communications protocols.

What is claimed is:

1. A method for a communication between an application and a physical object using a digital twin of the physical object, the method comprising the following steps:
   generating descriptive data that include properties of digital data of the physical object based on a descriptive meta model;
   producing communication information;
   combining the descriptive data, the communication information, and a designation of the physical object, and storing the combination in a registry to create the digital twin, the registry also storing properties of other digital twins for other physical objects, wherein the digital twin and the other digital twins are separate from the registry; and
   reading out, by the application, information of the registry including the communication information, wherein the information read out by the application from the registry provides the application with all information required for carrying out a data exchange between the application and the digital twin; and
   using, by the application, the information read out by the application including the communication information for the data exchange with the digital twin;
   wherein the communication information indicates interfaces of the digital twin for the data exchange between the application and the digital twin and communication protocols of the digital twin for the data exchange between the application and the digital twin, the communication protocols indicating methods the application is to use for communication with the interfaces;
   wherein the data exchange includes: (i) transferring, to the application by the digital twin, sensor values of the physical object, or state changes of the physical object, or diagnostic data of the physical object, and (ii)

transferring control commands from the application to the digital twin, the control commands for controlling the physical object.

2. The method as recited in claim 1, wherein the descriptive meta model indicates general characteristics for the properties of the digital data.

3. The method as recited in claim 2, wherein the general characteristics denote the properties of the digital data with regard to a semantic interpretability, or a sequence, or a time, or a time period, or a permissible value range, or a measure to be applied, or a unit of measurement, or a data structure, or significance of the digital data with regard to the machine.

4. The method as recited in claim 1, wherein specific properties of the machine are denoted by the descriptive meta model by additional special characteristics.

5. The method as recited in claim 1, wherein the interfaces indicate addresses used for the data exchange between the application and the digital twin.

6. The method as recited in claim 1, wherein the descriptive data are taken from a catalog including types of descriptive data.

7. The method as recited in claim 1, wherein the digital twin has a multitude of descriptive data, the multitude of descriptive data being taken from a catalog of groups of descriptive data.

8. A method for a communication between an application and a machine in a production, using a digital twin of the machine, the method comprising the following steps:
   generating descriptive data that include properties of digital data of the machine based on a descriptive meta model;
   producing communication information;
   combining the descriptive data, the communication information, and a designation of the machine, and storing the combination in a registry to create the digital twin, the registry also storing properties of other digital twins for other machines, wherein the digital twin and the other digital twins are separate from the registry, wherein the digital twin and the other digital twins are separate from the registry;
   reading out, by the application, information from the registry, the read-out information including the communication information, wherein the information read out by the application from the registry provides the application with all information required for carrying out a data exchange between the application and the digital twin; and
   using, by the application, the read-out information including the communication information for the data exchange with the digital twin;
   wherein the communication information indicates interfaces of the digital twin for the data exchange between the application and the digital twin and communication protocols of the digital twin for the data exchange between the application and the digital twin, the communication protocols indicating methods the application is to use for communication with the interfaces;
   wherein the data exchange includes: (i) transferring, to the application by the digital twin, sensor values of the machine, or state changes of the machine, or diagnostic data of the machine, and (ii) transferring control commands from the application to the digital twin, the control commands for controlling the machine.

9. The method as recited in claim 8, wherein the descriptive meta model indicates general characteristics for the properties of the digital data.

10. The method as recited in claim 9, wherein the general characteristics denote the properties of the digital data with regard to a semantic interpretability, or a sequence, or a time, or a time period, or a permissible value range, or a measure to be applied, or a unit of measurement, or a data structure, or significance of the digital data with regard to the machine.

11. The method as recited in claim 8, wherein specific properties of the machine are denoted by the descriptive meta model by additional special characteristics.

12. The method as recited in claim 8, wherein the interfaces indicate addresses used for the data exchange between the application and the digital twin.

13. The method as recited in claim 8, wherein the descriptive data are taken from a catalog including types of descriptive data.

14. The method as recited in claim 8, wherein the digital twin has a multitude of descriptive data, the multitude of descriptive data being taken from a catalog of groups of descriptive data.

* * * * *